United States Patent
Elpern et al.

(10) Patent No.: US 7,988,426 B2
(45) Date of Patent: Aug. 2, 2011

(54) COMPRESSOR PORTED SHROUD FOR FOIL BEARING COOLING

(75) Inventors: David G. Elpern, Los Angeles, CA (US); Niall McCabe, Torrance, CA (US); Mark Gee, South Pasadena, CA (US)

(73) Assignee: Honeywell International Inc., Morristown, NJ (US)

( * ) Notice: Subject to any disclaimer, the term of this patent is extended or adjusted under 35 U.S.C. 154(b) by 1043 days.

(21) Appl. No.: 11/032,418

(22) Filed: Jan. 10, 2005

(65) Prior Publication Data

US 2006/0153704 A1 Jul. 13, 2006

(51) Int. Cl.
*F03B 11/06* (2006.01)
*F01D 25/16* (2006.01)

(52) U.S. Cl. .......... 417/53; 417/407; 415/112; 415/229; 416/174

(58) Field of Classification Search .................. 417/407; 415/112, 229; 416/174
See application file for complete search history.

(56) References Cited

U.S. PATENT DOCUMENTS

| | | | |
|---|---|---|---|
| 2,578,785 A | 12/1951 | Davis | |
| 2,680,001 A | 6/1954 | Batt | |
| 2,858,101 A | 10/1958 | Alford | |
| 3,287,907 A | 11/1966 | Bill | |
| 3,740,163 A | 6/1973 | Schinnerer et al. | |
| 3,969,804 A * | 7/1976 | MacInnes et al. | ....... 29/888.025 |
| 4,127,988 A | 12/1978 | Becker | |
| 4,364,717 A | 12/1982 | Schippers et al. | |
| 4,376,617 A | 3/1983 | Okano et al. | |
| 4,725,206 A | 2/1988 | Glaser et al. | |
| 4,786,238 A | 11/1988 | Glaser et al. | |
| 4,926,658 A * | 5/1990 | Olsen et al. | .................. 62/324.1 |
| 5,087,176 A * | 2/1992 | Wieland | ........................ 417/407 |
| 5,113,670 A | 5/1992 | McAuliffe et al. | |
| 5,248,245 A | 9/1993 | Behnke et al. | |
| 6,455,964 B1 | 9/2002 | Nims | |
| 6,623,239 B2 | 9/2003 | Sahay et al. | |

* cited by examiner

*Primary Examiner* — William H Rodríguez
*Assistant Examiner* — Philip Stimpert
(74) *Attorney, Agent, or Firm* — Robert Desmond, Esq.

(57) ABSTRACT

A compressor ported shroud takes compressed air from the shroud of the compressor before it is completely compressed and delivers it to foil bearings. The compressed air has a lower pressure and temperature than compressed outlet air. The lower temperature of the air means that less air needs to be bled off from the compressor to cool the foil bearings. This increases the overall system efficiency due to the reduced mass flow requirements of the lower temperature air. By taking the air at a lower pressure, less work is lost compressing the bearing cooling air.

4 Claims, 4 Drawing Sheets

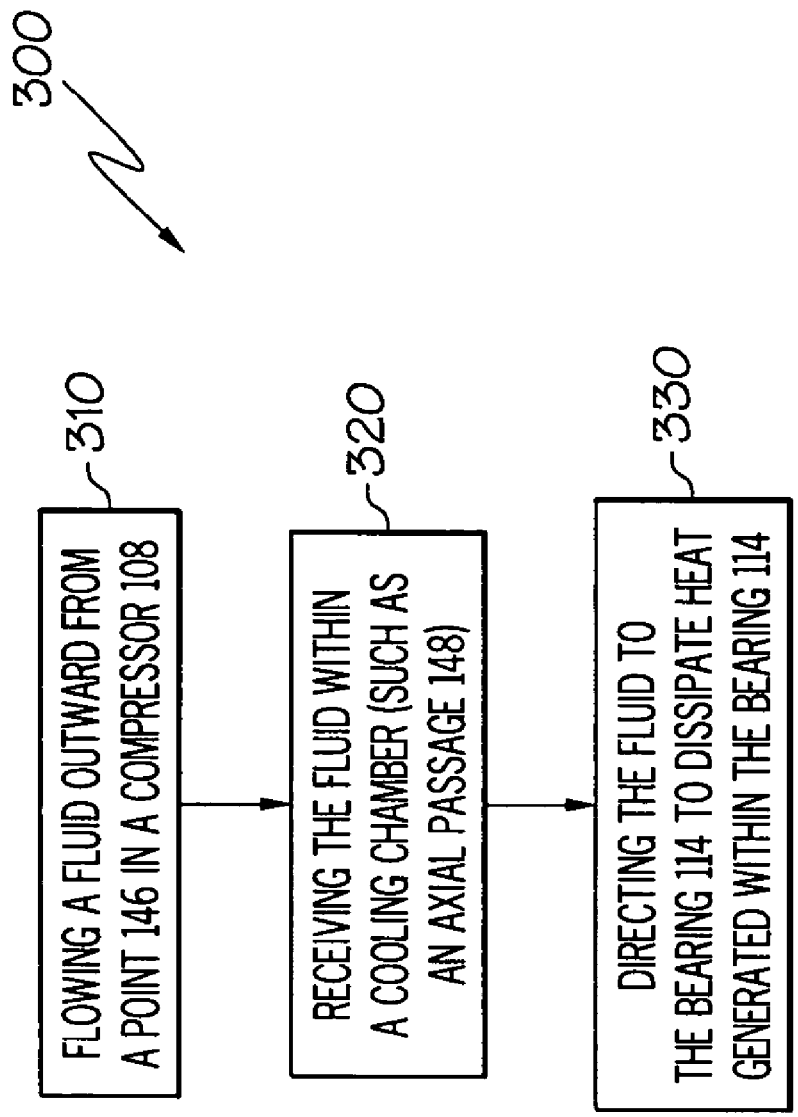

COMPRESSOR PORTED SHROUD FOR FOIL BEARING COOLING

GOVERNMENT RIGHTS

This invention was made with the support of the United States Government under Contract DE-FC04-02-AL67624 awarded by the Department of Energy under its PEM Fuel Cell Turbo-Compressor Program. The Government may have certain rights to this invention.

BACKGROUND OF THE INVENTION

The present invention generally relates to gas lubricated bearings associated with the rotating shafts of gas turbines, turbochargers, and turbocompressors, and more specifically, to an apparatus and method for cooling such bearings by dissipating heat from the bearings.

In gas turbine engines, or any other machinery in which high temperature rotors are situated adjacent to high speed bearings, it is essential to maintain the bearings at an acceptably low temperature. This is normally achieved, when the engine is running, by providing the bearings with an adequate supply of lubricating oil from a pump driven by the engine or an external motor driven pump. However, this supply of cooling oil ceases when the engine stops, and the residual heat in the turbine rotor can be sufficient to damage the bearings adjacent the turbine rotor. Such bearings are especially vulnerable to the effect of heat-soak in the case of a gas turbine engine having a regenerative heat-exchanger and a thermally insulated main casing, because the residual heat in the turbine rotor on shutdown is virtually prevented from being dissipated to the atmosphere.

Bearings located adjacent to turbine rotors are exposed to temperatures which are sometimes higher than is desirable because of conduction and the radiation of heat from the elevated temperature rotor. This may occur during steady state operation as well as after shutdown due to transfer of heat from the hot turbine wheels through the thermally conducting shaft to the bearings. In either case, the temperature rise occurring in the bearings may be more than can be tolerated by either the materials of which the bearing or the lubricant is constructed.

It is important that the material limits and restrictions involving the bearings be maintained in order to provide the desired service life of the machinery. If the temperature exceeds acceptable limits, there may be a loss of wearability of foil bearing coatings or, in the extreme case, evaporation and destruction of the coating. Similarly, the foil material may creep if the temperature is too high, with attendant loss of elasticity and load bearing capacity.

The prior art appears to disclose at least one attempt to use bleed air taken from the compressor to cool particular components in turbomachinery, such as turbine blades, turbine exhaust, bearings and/or interstitial spaces within the machinery. In U.S. Pat. No. 5,087,176 to Wieland ("Wieland patent"), an apparatus for cooling pliant film bearings incorporates a shaft. Cooling air is circulated through the interior of the shaft and the bearing shaft is isolated from a turbine wheel. Bleed air may be directed from the compressor to cool the foil bearings. However, the Wieland patent does not disclose any criteria for assigning a location for the point in the compressor where bleed air may be drawn from the compressor. Additionally, the Wieland patent does not disclose any relationship between the size of the bleed hole through which the air is bled and the size of other chambers within the engine.

As can be seen, there is a need for an improved apparatus and method for cooling bearings that take advantage of useful bleed point locations, or bleed hole and chamber size relationships.

SUMMARY OF THE INVENTION

In one aspect of the present invention, an apparatus for cooling a bearing in a turbomachine comprises a shaft that rotates within the bearing; and a shroud having a port fluidly communicating a source of cooling fluid with the bearing; wherein the port has a slot, with a slot area, and a recovery chamber; wherein the ratio of the slot area to an area of the recovery chamber is between about 1.75 to about 2.25.

In another aspect of the present invention, an apparatus for cooling a turbomachinery bearing comprises a rotatable shaft; the bearing extending about the rotatable shaft such that the rotatable shaft rotates within the bearing; a turbine wheel coupled to the rotatable shaft; a compressor having a compressor wheel coupled to the rotatable shaft; and a shroud having a port in fluid communication with the compressor and the bearing; wherein the location of the port is a function of a pressure ratio.

In another aspect of the present invention, an apparatus for cooling a turbomachinery bearing comprises a rotatable shaft; the bearing extending about the rotatable shaft such that the rotatable shaft rotates within the bearing; a turbine wheel coupled to the rotatable shaft; a compressor having a compressor wheel coupled to the rotatable shaft; and a shroud having a port in fluid communication with the compressor and the bearing; wherein the port has a slot, with a slot area, and a recovery chamber; wherein a ratio of the slot area to an area of the recovery chamber is between about 1.75 to about 2.25.

In a further aspect of the present invention, a turbine engine comprises a rotatable shaft; a pliant foil bearing having a plurality of foils extending about the rotatable shaft such that the rotatable shaft rotates within the pliant foil bearing; a turbine wheel coupled to the rotatable shaft; a compressor having a compressor wheel coupled to the rotatable shaft; and a shroud disposed about the compressor and having a port in fluid communication with the compressor and the pliant foil bearing; wherein fluid recirculates between a point in the compressor and the pliant foil bearing to dissipate heat generated within the pliant foil bearing; wherein the port has a slot, with a slot area, and a recovery chamber; wherein the ratio of the slot area to an area of the recovery chamber is between about 1.75 to about 2.25.

In yet a further aspect of the present invention, a method for cooling a bearing comprises flowing a fluid outwardly from a point in a compressor; receiving the fluid within a cooling chamber; and directing the fluid to the bearing to dissipate heat generated within the bearing; wherein the location of the point in the compressor is a function of a pressure ratio.

In still yet a further aspect of the present invention, an apparatus for cooling a motor comprises a shaft that rotates within a bearing; and a shroud having a port fluidly communicating a source of cooling fluid with the bearing; wherein the port has a slot, with a slot area, and a recovery chamber; wherein the ratio of the slot area to an area of the recovery chamber is between about 1.75 to about 2.25.

These and other aspects, objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 5 is a flow chart of a method for cooling a bearing, according to still another embodiment of the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides an apparatus and method for cooling bearings in gas turbines. The present invention may also be used to cool an integral motor (such as a compressor, turbine, and motor integral on the same shaft). The cooling apparatus produced according to the present invention may find beneficial use in many industries including aerospace and industrial applications. The cooling apparatus of the present invention may be beneficial in applications including electricity generation, naval propulsion, pumping sets for gas and oil transmission, aircraft propulsion, automobile engines, and stationary power plants. This invention may be useful in any gas turbine engine application. The present invention may also be useful in any motor driven turbocompressor application.

By taking partially compressed air from the shroud of the compressor before it is completely compressed the apparatus of the present invention may deliver air at a lower pressure and temperature than compressor outlet air. The lower temperature of the air means that less air needs to be bled off from the compressor to cool the foil bearings. This may increase the overall system efficiency due to the reduced mass flow requirements of the lower temperature air. By taking the air at a lower pressure, less work may be lost compressing the bearing cooling air.

In contrast, conventional designs for systems that bleed cooling air from compressor shrouds are not capable of drawing cooling air from specific locations to provide optimal air flow to accommodate various pressure ratios. Additionally, conventional designs do not enable assigning a location for the point in the compressor where bleed air may be drawn from the compressor. Furthermore, conventional designs do not disclose any relationship between the size of the bleed hole through which the air is bled and the size of other chambers within the engine.

Figure 1:
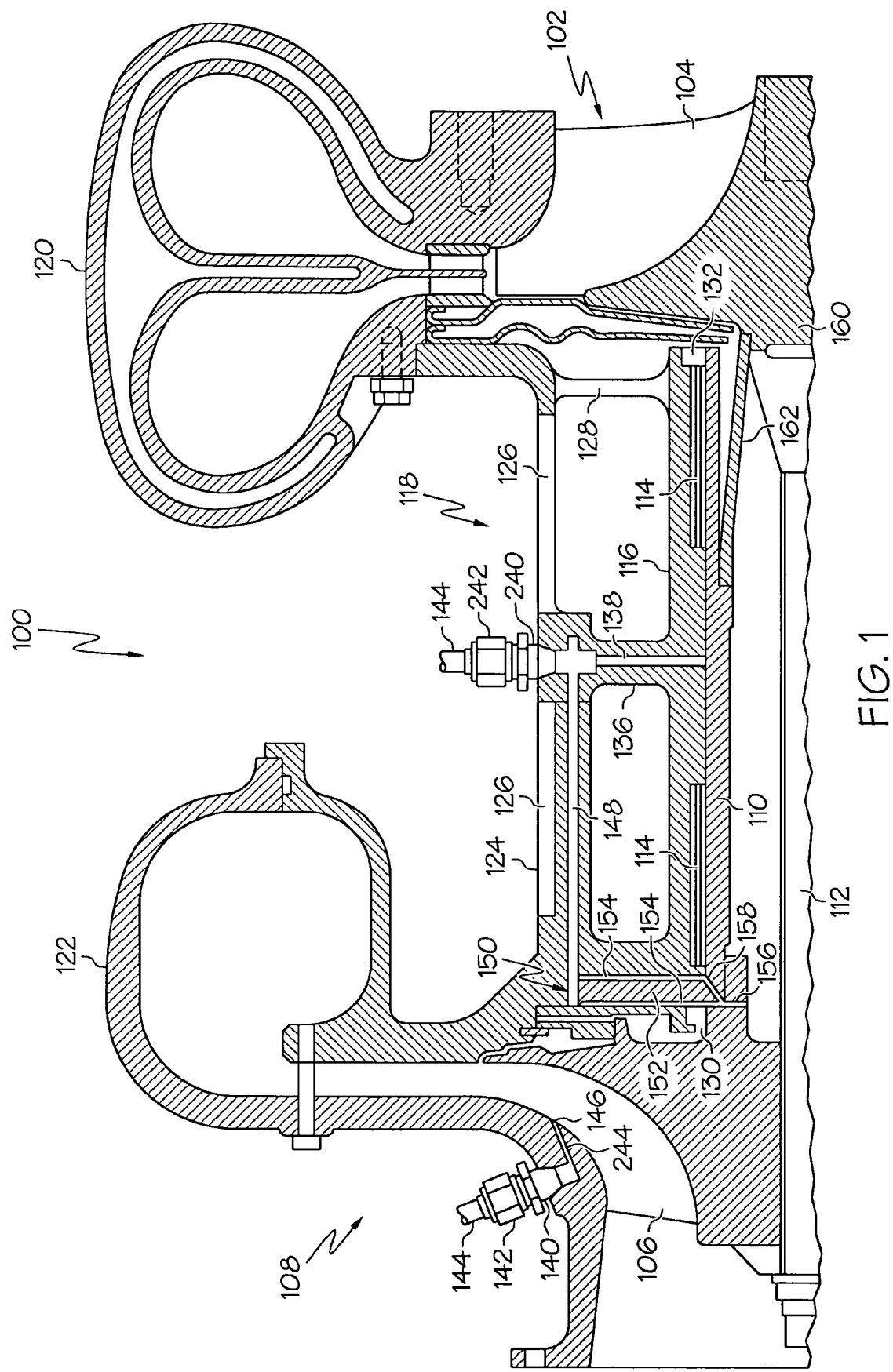
FIG. 1 is a cross sectional view of a turbine engine, according to an embodiment of the present invention.

In more specifically describing the present invention and as can be appreciated from FIG. 1, the present invention may provide a turbine engine 100, such as a compressor and turbine, or a turbocharger, which may be located aboard an aircraft, missile, spacecraft, tank, and the like. FIG. 1 is a partial sectional view of the turbine engine 100 incorporating one particular arrangement in accordance with the present invention. The turbine engine 100 may incorporate a subassembly 102 comprising a first rotating component, such as a turbine wheel 104 and a second rotating component, such as a compressor wheel 106 (within a compressor 108) mounted on a shaft 110 (such as a rotatable shaft), the entire subassembly 102 being tied together by a central tie bolt 112. The compressor 108, the turbine wheel 104, and the compressor wheel 106 may comprise any suitable material, such as die cast aluminum. The turbine wheel 104 may be coupled to the rotatable shaft 110. The compressor wheel 106 may be coupled to the rotatable shaft 110.

The shaft 110 may be a journal bearing shaft supported on pliant film bearings 114, mounted within a bearing housing 116. The pliant foil bearings 114 may have a plurality of foils extending about the rotatable shaft 110 such that the rotatable shaft 110 rotates within the pliant foil bearing 114.

The bearing housing 116 may be a part of a cylindrical spacer or separator member 118, which may extend between a turbine housing 120 and a compressor housing 122 of the turbine wheel 104 and the compressor wheel 106. The separator member 118 may be provided with a thin outer cylindrical portion 124 having a plurality of longitudinal slots 126 and may be tied to the bearing housing 116 by a plurality of spokes 128. A conventional labyrinth seal 130 within the compressor housing 122 may contact adjacent rotating portions of the compressor wheel 106 to limit the escape of fluid (such as process gas) from the compressor 108 into a central section of the turbine engine 100. A corresponding labyrinth seal 132 may be mounted in position against the right-hand end of the shaft 110 to prevent contaminants such as combustion products from the turbine housing 120 from reaching the bearing foils 114.

Approximately midway between opposite ends of the separator member 118 may be situated a hollow radial member 136 which may extend between the outer cylindrical portion 124 and the bearing housing 116. This radial member 136 may be drilled to provide a central bore 138 extending downward through the bearing housing 116. A spoke 128 may be formed for structural support. An outer end of the hollow radial member 136 may be tapped to receive an adaptor 140, to which may be threaded a retaining nut 142 on a section of flared tubing 144 leading to a corresponding set of fittings 240 and 242, which may be connected to the section of flared tubing 144. The flared tubing 144 may communicate with a compressor passage 244 into the compressor 108 to draw pressurized gas therefrom at point 146. Cooling fluid (such as air or process gas) may enter through the compressor wheel 106 and recirculate between the point 146 in the compressor 108 and the pliant foil bearing 114 to dissipate heat generated within the pliant foil bearing 114. The location of the point 146 in the compressor 108 may be a function of a pressure ratio. A pressure ratio may be the ratio of the pressure at the compressor outlet 202 to the pressure at the compressor inlet 200. The outer cylindrical portion 124 may also be drilled to provide a cooling chamber, such as an axial passage 148 communicating with the hollow bore 138 at the radial member 136 to receive gas introduced from the compressor 108 via the tubing 144. The axial passage 148 may be a cooling chamber for receiving fluid flowing outwardly from the point 146 in the compressor 108 and directing the received fluid to the pliant foil bearing 114.

The shaft 110 may rotate within the journal bearings 114 and may have, at an end adjacent the compressor 108, a thrust bearing 150 comprising a thrust bearing runner 152 which may be integrally formed with the shaft 110 and which may rotate between thrust bearing foils 154. Pressurized gas may be directed to the thrust bearing 150 via the axial passage 148. Small, drilled passages 156 and 158 may be provided to carry gas from the thrust bearing foils 154 and the journal bearing foils 114 adjacent the thrust bearing 150 to the interior of the shaft 110.

A long thin-walled, generally frusto-conical support member 162 may be mounted on the hub 160. The support member 162 may be mounted adjacent to the tie bolt 112 and the support member 162 may be joined to the shaft 110 near the middle thereof. The support member 162 may be formed of low thermal conductivity material, such as stainless steel or titanium. The support member 162 may be considered an intermediate shaft generally concentric with the shaft 110 and extending at a shallow angle radially inward therefrom. This support member 162, acting as an intermediate shaft, thus may inhibit the transfer of heat to the shaft 110.

Figure 2:
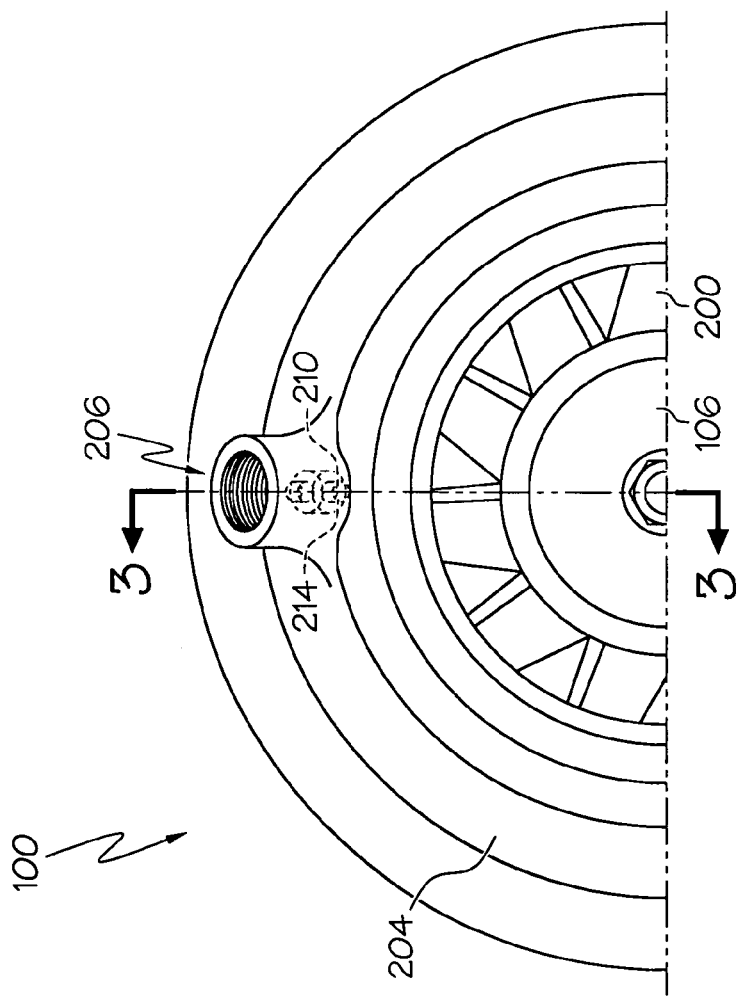
FIG. 2 is a plan view of a compressor, according to another embodiment of the present invention.

FIG. 2 shows the compressor end of a turbine engine 110. A shroud 204 may be disposed about the compressor 108 (shown in FIG. 1), including the compressor wheel 106. The shroud 204 may have a port 206. The port 206 may be in fluid communication with the compressor 108 and a pliant foil bearing 114.

Figure 3:
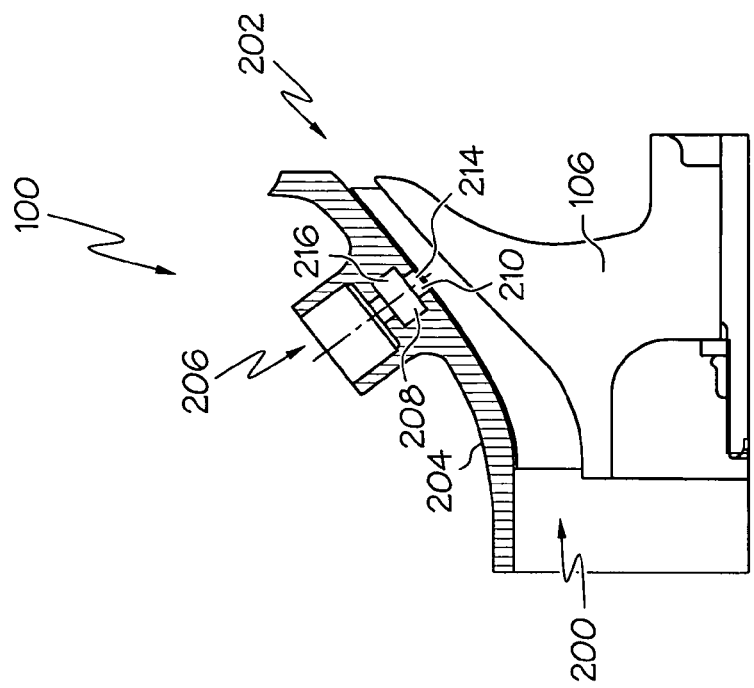
FIG. 3 is a cross sectional view, taken along line 3-3 of the compressor of FIG. 2.

FIG. 3 is a cross sectional view, taken along line 3-3 of the compressor of FIG. 2. Fluid may enter through a compressor inlet 200 and the fluid may exit through a compressor outlet 202. A portion of the fluid may be diverted through the port 206 before being completely compressed. The port 206 may have a slot 210, with a slot 210 area 214, and a recovery chamber 208. The ratio of the slot 210 area to the area of the recovery chamber 208 area 216 may be between about 1.75 to about 2.25. To ensure the ported shroud 204 operates as efficiently as possible, it is advantageous to recover as much static pressure as possible from the extracted air. Experiment has shown that to optimize the static pressure recovery of the bearing cooling air flow, the ratio of the slot 210 area to the area of the recovery chamber 208 should be between about 1.75 to about 2.25. The area change from the shroud port to the recovery chamber and its effect on the static pressure can be modeled as a sudden expansion, due to the rapid change in the area ratio. It is well known that the static pressure rise in the sudden expansion mixing process can be expressed in terms of the dynamic pressure of the flow from the shroud port and the expansion area ratio as a pressure rise coefficient, $C_p$, $$C_p = \frac{p_2 - p_1}{1/2 \rho u_1^2} = \frac{2}{AR}\left(1 - \frac{1}{AR}\right)$$

where
$P_2$=Static pressure in the Recovery chamber
$P_1$=Static pressure in the shroud port
$\rho$=Air density
$U_1$=Velocity of the air in the shroud port
$AR = A_2/A_1$,
   $A_2$=Area of the Recovery chamber
   $A_1$=Area of the Ported Shroud.
As the area ratio (AR) of the expansion is increased from unity, the static pressure rise increases to a maximum at AR=2. It then drops to zero at high values of AR.

Figure 4:
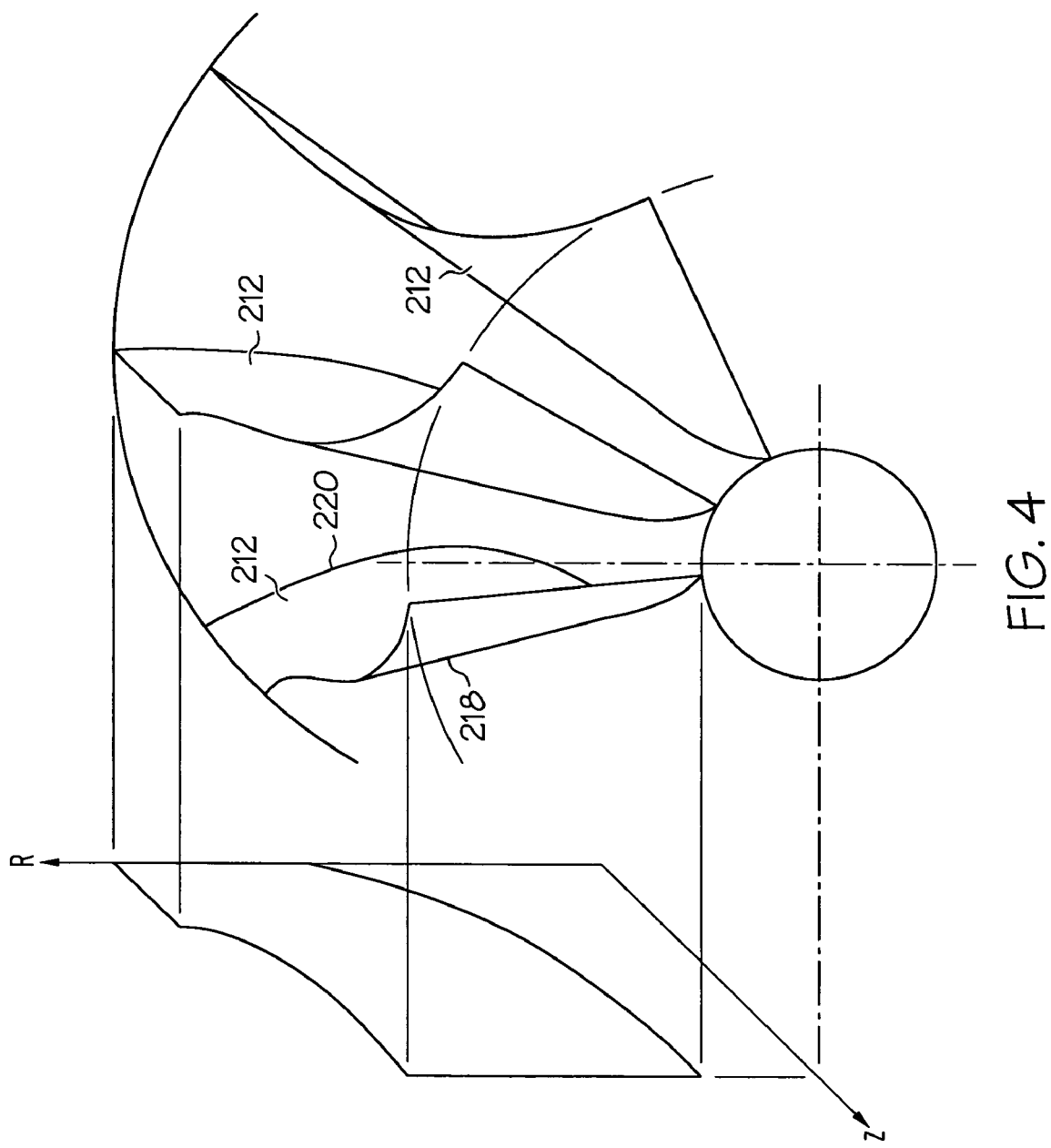
FIG. 4 is a schematic view of a portion of a compressor with a meridional projection of a compressor blade, according to yet another embodiment of the present invention.

The location of the port 206 in the shroud 204 may be a function of the pressure ratio (pressure at the compressor outlet 202 divided by the pressure at the compressor inlet 200). As shown in FIG. 4, for a specific pressure ratio range the port 206 (shown in FIG. 2) location may be situated at a certain percentage of the shroud lines meridional length. In a normal right-hand cylindrical coordinate system (r, z, θ), the meridional plane is a plane of constant θ, the r-z plane. The shroud line of the blade 212 may be projected on to this plane and the location of the port 206 may be specified as a percentage of the shroud lines meridional length. Meridional length may be defined as $$m = \int \sqrt{dz^2 + dr^2}$$

The meridional length of the blade 212 shroud line may start at the leading edge 218 of the blade 212 (0% meridonal length). The meridional length may run to the trailing edge 220 of the blade 212 (100% meridonal length).

The pressure drop across a complete set of air bearings (for example, one thrust bearing 150 and two journal bearings 114) may be a function of the rotor RPM (revolutions per minute) and flow rate. Air bearings may require a maximum pressure drop between 8 psig-12 psig at a maximum flow rate condition.

For turbine engines with a pressure ratio between 1.5 and 2.0 and maximum cooling flow, the port 206 may be located between about 75% to about 95% of the shroud line meridonal length.

For a pressure ratio requirement between 2 and 3.5 and maximum cooling flow, the port 206 may be located between about 50% to about 75% of the shroud line meridional length.

For a pressure ratio between 3.5 and 5.0 and maximum cooling flow, the port 206 may be located at the shroud meridional length between about 25% to about 50%.

This information is summarized in Table 1:

TABLE 1

| Machine Pressure Ratio | Port Location |
| --- | --- |
| 1.5 | 90%-95% |
| 2.0 | 75%-80% |
| 2.5 | 65%-70% |
| 3.0 | 55%-65% |
| 3.5 | 45%-50% |
| 4.0 | 35%-45% |
| 5.0 | 25%-35% |

The location of the port 206 may also allow cooling flow to the bearing 114 for the low speed operation of the turbine engine 100. As the speed of the machine rotor is reduced, the pressure drop required by the air bearings may also be reduced. The location of the slot 210 thus may allow for the air bearings to operate across an engine operation range that includes conditions at low speeds.

With reference to FIG. 5, a method 300 for cooling a bearing may comprise a step 310 of flowing a fluid outwardly from a point 146 in a compressor 108. A step 320 may comprise receiving the fluid within a cooling chamber (such as an axial passage 148) and a step 330 may comprise directing the fluid to the bearing 114 to dissipate heat generated within the bearing 114. The fluid may be any useful fluid, such as air or process gas. The location of the point 146 in the compressor 108 may be a function of the pressure ratio. A port 206 may be situated at the point 146 in compressor 108, and the port 206 may have a slot 210, with a slot 210 area 214, and a recovery chamber 208. The ratio of the slot 210 area 214 to the area 216 of the recovery chamber 208 may be between about 1.75 to about 2.25.

It should be understood, of course, that the foregoing relates to exemplary embodiments of the invention and that modifications may be made without departing from the spirit and scope of the invention as set forth in the following claims.

We claim:
1. A method for cooling a bearing, comprising:
   flowing a fluid outwardly from a port in a compressor;
   locating the port, along a meridional length of a shroud line, in accordance with relationships:
   port location 90% to 95% of the meridional length for a pressure ratio between 1.5 and 2.0;
   port location 75% to 80% of the meridional length for a pressure ratio between 2.0 and 2.5;

port location 65% to 70% of the meridional length for a pressure ratio between 2.5 and 3.0;
port location 55% to 65% of the meridional length for a pressure ratio between 3.0 and 3.5;
port location 45% to 50% of the meridional length for a pressure ratio between 3.5 and 4.0;
port location 35% to 45% of the meridional length for a pressure ratio between 4.0 and 5.0; and
port location 25% to 35% of the meridional length for a pressure ratio of 5.0 or greater,
wherein the pressure ratios are ratios of pressure at a compressor outlet to pressure at a compressor inlet;
receiving the fluid within a cooling chamber; and
directing the fluid to the bearing to dissipate heat generated within the bearing.

2. The method of claim 1, wherein the port is situated at a point in the compressor and the port has a slot, with a slot area, and a recovery chamber.

3. The method of claim 2, wherein the ratio of the slot area to the area of the recovery chamber is between 1.75 to 2.25.

4. The method of claim 1, wherein the fluid is process gas.

* * * * *